J. F. O'CONNOR.
ANTIFRICTION CENTER BEARING FOR RAILWAY CARS.
APPLICATION FILED JAN. 17, 1908.
909,106.
Patented Jan. 5, 1909.
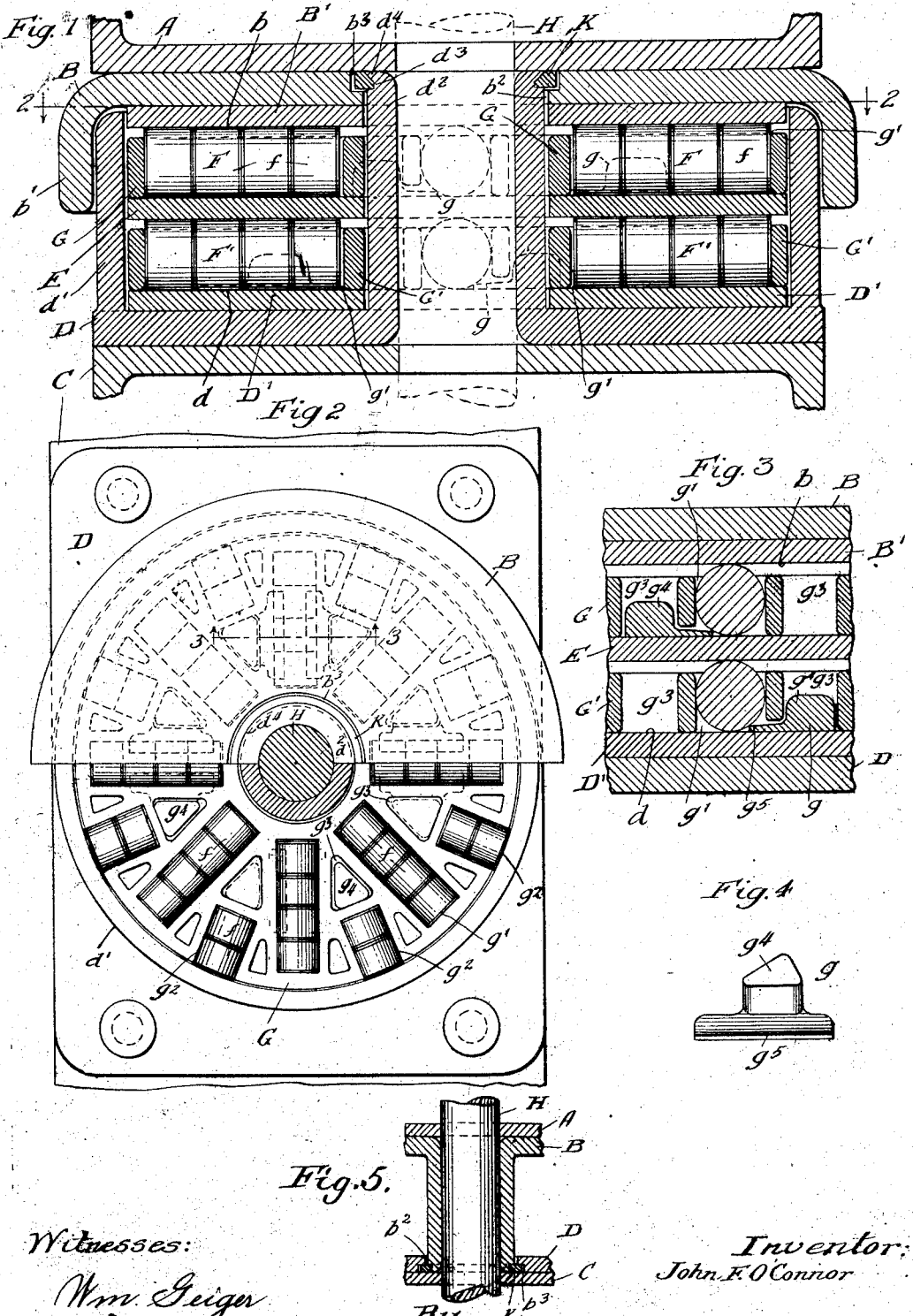
Witnesses:
Wm. Geiger
A. W. Munday
Inventor:
John F. O'Connor
By Munday, Evarts, Adcock & Clarke.
Attorneys

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

ANTIFRICTION CENTER-BEARING FOR RAILWAY-CARS.

No. 909,106.     Specification of Letters Patent.     Patented Jan. 5, 1909.

Application filed January 17, 1908. Serial No. 411,259.

*To all whom it may concern:*

Be it known that I, JOHN F. O'CONNOR, a citizen of the United States, residing in Chicago, in the county of Cook and State of Illinois, have invented a new and useful Improvement in Antifriction Center-Bearings for Railway-Cars, of which the following is a specification.

My invention relates to anti-friction center bearings for railway cars or other vehicles.

In anti-friction center bearings for railway cars of the kind more generally in use and having an upper bearing member provided with a conical tread and a lower bearing member or plate provided with a conical upper bearing face or tread and a series of conical rollers interposed between such upper and lower bearing plates, under the enormous load of the modern large heavy cars, difficulty and inefficient operation has been experienced, owing to the tendency of the conical rollers to work radially outward in operation owing to their conical form and to the conical treads or faces of the upper and lower bearing plates and thus to produce a great end friction, wearing and binding action against the rim or rims of the bearing plates, and where cylindrical rollers and flat treads have been substituted for conical rollers and conical treads, this has usually been done at the expense and added friction incident to the use of a number of radially arranged spindles or shafts to hold the cylindrical rollers in radial arrangement, and also at the expense of diminshing the number of rollers to that capable of being accommodated by the comparatively small circle at the inner ends of their radially arranged spindles or shafts.

The object of my invention is to provide an anti-friction center bearing of a simple, strong and durable construction by means of which the difficulties or objections heretofore experienced with the conical rollers and conical treads on the upper and lower bearing plates may be practically overcome without occasioning any other serious difficulty or inefficiency of action and without materially diminshing the number of radial roller supports between the upper and lower center plates or otherwise weakening the center bearing.

My invention consists in the means I employ to practically accomplish this object or result. That is to say, it consists in an anti-friction center bearing comprising an upper and a lower bearing plate, each furnished with horizontal or plain annular treads or bearing faces in connection with a series of radially arranged cylindrical sectional rollers between the upper and lower bearing plates, each section of each roller being preferably about an inch in diameter and about three quarters of its diameter in length, so that the several sections may rotate independently of each other according to their radial distance from the king bolt or axis of the center plate. The radially arranged sectional rollers are alternately long and short rollers, the long rollers having preferably about double the number of sections that the short rollers have. By making the radially arranged sectional rollers alternately long and short, I practically double the number of rollers between the center plates and thus effectually utilize in roller supports the available space between the center plates.

It further consists in combining with the upper and lower center plates, an intermediate annular plate and an upper and lower series of radially arranged cylindrical sectional rollers, one set or series being interposed between the upper center plate and the intermediate plate and the other series or set being interposed between the intermediate annular bearing plate and the lower center plate.

It further consists in combining with these parts, two roller spacing spiders, one for the upper set of rollers and the other for the lower set of rollers, each furnished with a series of roller chocking lips, one for each roller of each set, each operating to permit its roller to turn in one direction and to chock its roller from turning in the opposite direction, the chocking lips of the upper spider permitting the upper set of rollers to turn when the bolsters oscillate in one direction in respect to each other, and the chocking lips of the lower spider to permit the lower set of rollers to turn when the bolsters oscillate in the opposite direction in respect to each other, whereby both sets of rollers are caused to always rotate in the same direction when they turn at all. The two sets of rollers or anti-friction devices thus operate alternately, one set when the bolsters oscillate in one direction and the other set when the bolsters oscillate in the other direction, each set being alternately locked or chocked from rotation. The intermediate annular plate which is interposed between the two sets of sectional cylindrical rollers turns always in the same direction.

My invention also consists in the novel construction of parts and devices and in the novel combinations of parts and devices herein shown and described.

In the accompanying drawing forming a part of this specification, Figure 1 is a central vertical section of an anti-friction center bearing embodying my invention. Fig. 2 is a plan view partly in horizontal section looking from the line 2—2 of Fig. 1, the plate $B^1$ being removed, showing half of the upper center plate in plan. Fig. 3 is a detail vertical section on line 3—3 of Fig. 2. Fig. 4 is a detail perspective view of a part hereinafter to be described. Fig. 5 shows a modification.

In the drawing, A represents the body bolster of a railway car or other vehicle, B the upper center plate secured thereto, C the truck bolster, D the lower center plate secured thereto, E the intermediate annular plate, F the upper set of sectional cylindrical rollers, each comprising a plurality of radially arranged cylindrical sections $f$, preferably about one inch in diameter and three quarters of an inch in length, $F^1$ the lower set of sectional anti-friction rollers, each likewise comprising a plurality of sections $f$, G the upper roller spacing spider, $G^1$ the lower roller spacing spider and $g$ the separate piece chock devices with which the roller spacing spiders G $G^1$ are provided and H the king bolt which connects the bolsters and center plates.

The upper center plate B preferably has a plain horizontal tread or bearing face $b$, and the lower center plate D has a corresponding plain horizontal annular tread or bearing face $d$; and the intermediate annular bearing plate E which is interposed between the upper and lower sets of cylindrical rollers F $F^1$ is a plain flat ring or plate with plain flat parallel upper and lower faces to bear against the cylindrical rollers. The center plates B, D are provided with interengaging annular flanges or rims $b^1$ $d^1$, the rim $b^1$ of the upper plate preferably surrounding the rim $d^1$ of the lower plate D as the two rims telescope together. The upper center plate B has a central opening $b^2$ in which fits the annular hub $d^2$ of the lower center plate. The annular hub $d^2$ of the lower center plate is provided at its upper edge with an annular recess $d^3$, and the upper plate B with a similar recess $b^3$ to receive a connecting ring K, by which the upper and lower center plates are connected together or held in their assembled position after being once assembled by means of a flange or lip $d^4$ on the hub of the lower center plate adjacent to said annular recess $d^3$ which is hammered or turned down partly over the connecting ring K after the parts are assembled.

The roller spacing spiders G $G^1$ are each furnished with a plurality of rectangular pockets $g^1$ $g^2$, one for each of the cylindrical sectional rollers F $F^1$. These rectangular pockets $g^1$ $g^2$ are alternately of different lengths, the longer ones $g^1$ being adapted to receive four of the sections $f$ of the rollers F $F^1$ and the shorter ones $g^2$, two of such sections $f$. Each of the roller spacing spiders G is also furnished with a plurality of openings $g^3$, preferably of triangular shape adapted to receive the shanks $g^4$ of the separate piece roller chocking devices $g$, the lips $g^5$ of which operate to chock the roller adjacent thereto from turning when the bolsters oscillate in one direction, but leave such roller free to turn when the bolster oscillates in the other direction. The roller chocking devices $g$ of the upper spider G are arranged on one side of the rollers F and operate to chock the rollers F from turning when the oscillation of the bolsters is toward the left while the roller chocking devices $g$ fitting in the lower spider $G^1$ are on the opposite side of the rollers $F^1$ and operate to chock the lower set of rollers $F^1$ from turning when the oscillation of the bolsters is toward the right. Successive oscillations of the bolsters toward the left thus impart successive turning movements in one and the same direction to the upper set of rollers F, while successive oscillations of the bolsters in the opposite direction impart successive turning movements to the lower set of rollers $F^1$ in the opposite direction, each set of rollers alternately turning and alternately being chocked or locked from turning according as the bolsters oscillate in one direction or the other. The intermediate annular plate E is thus given a continuous turning movement always in the same direction, the same being alternately chocked or locked to the upper and lower center plates and the rollers contacting therewith.

The spiders G and $G^1$ fit loosely between the intermediate annular plate E and the upper and lower center plates and the intermediate annular plate E likewise fits loosely between the upper and lower center plates. The upper and lower spiders G $G^1$ with their loose removable roller chocking devices $g$ arranged on opposite sides of their respective rollers thus serve somewhat after the principle of a pawl and ratchet to impart movement in one direction only to the interposed annular plate E through the coöperative action of the upper and lower sets of rollers F $F^1$. As in my invention, the upper and lower sets of rollers F F¹ always turn each successively in the same direction about its own axis, and as the intermediate annular plate E always turns successively in the same direction, the entire periphery of each section of each cylindrical sectional roller is uniformly acted upon and wears uniformly without tendency to produce flat spots thereon, and the same also applies to the intermediate plate E, while the upper set of rollers rotate about their own axes in the opposite direction from that in which the rollers of the lower set rotate about their own axes. The axes of both sets of rollers travel or circle around the center plates or the king bolt in the same direction and in the same direction that the intermediate plate rotates about its own axis it being of course understood that each set of rollers alternately turns and is alternately chocked or locked from turning according as the bolsters oscillate in one direction or the other, and that the intermediate annular plate E, while its turning movement is always in the same direction, is alternately locked or chocked to the upper and lower center plates and the rollers contacting therewith. In this connection it should be borne in mind that when the upper center plate, for example, moves to the right, say one inch, (see Fig. 3), the axis of the upper roller moves to the right but half as far, or a half inch, and then when the upper center plate swings back one inch to the left, the upper roller now chocked to the upper center plate, moves with it one inch to the left; so that the actual travel of the center or axis of the upper roller is one half inch to the left. As the center plates have plain flat horizontal treads or bearing faces and the rollers are cylindrical, the weight of the car and its load upon the center plates and interposed rollers produces no tendency to cause the rollers to work or crowd radially outward and thus engender undue friction or wearing against the surface of the spider against which the ends of the outermost roller sections abut. And as each roller is composed of a plurality of cylindrical sections, each comparatively short in length, the rollers and the sections thereof readily keep themselves in proper radial arrangement without undue friction and accommodate themselves to the different amounts of travel each undergoes according to the distance from the center of the center plates.

In the modification illustrated in Fig. 5, the hub is on the upper center plate, instead of on the lower one, the construction being otherwise the same.

The upper center plate B preferably has a separate piece lining or wearing plate B¹ inside the same for contacting with the anti-friction rollers which can be removed and replaced with another when worn. And the lower center plate D is preferably furnished with a similar separate piece lining or wearing plate D¹. The inner faces of these wearing plates B¹ D¹ are the tread faces.

I claim:—

1. The combination with upper and lower center plates, each furnished with plain flat treads or bearing faces a roller spacing spider having alternately arranged long and short radially extending rectangular pockets adapted each to receive a plurality of cylindrical roller sections and a plurality of radially arranged anti-friction sectional cylindrical rollers between the center plates, said radially arranged sectional rollers being alternately long and short ones substantially as specified.

2. The combination with upper and lower center plates, each furnished with plain flat treads or bearing faces and a plurality of radially arranged anti-friction sectional cylindrical rollers between the center plates, and a roller spacing spider furnished with alternately arranged long and short radially extending rectangular pockets adapted to receive a plurality of cylindrical roller sections, said radially arranged sectional rollers being alternately long and short ones substantially as specified.

3. The combination with upper and lower center plates having plain flat annular treads or bearing faces, an intermediate annular plate roller spacing spiders between said intermediate plate and said upper and lower center plates, each furnished with alternately arranged long and short radially extending rectangular pockets and upper and lower sets of sectional cylindrical rollers between said plates, said radially arranged sectional rollers being alternately long and short ones substantially as specified.

4. The combination with upper and lower center plates having plain flat annular treads or bearing faces, an intermediate annular plate and upper and lower sets of sectional cylindrical rollers between said plates, an upper roller spacing spider having alternately arranged long and short rectangular pockets and furnished with means for chocking the rollers of the upper set from turning when the bolsters oscillate in one direction, and a lower roller spacing spider having alternately arranged long and short rectangular pockets and furnished with means for chocking the rollers of the lower set from turning when the bolsters oscillate in the opposite direction, said radially arranged sectional rollers being alternately long and short ones substantially as specified.

5. The combination with upper and lower center plates having plain flat annular treads or bearing faces, an intermediate annular plate and upper and lower sets of sectional cylindrical rollers between said plates, an upper roller spacing spider having removable devices for chocking the rollers of the upper set from turning when the bolsters oscillate in one direction and a lower roller spacing spider having removable devices for chocking the rollers of the lower set from turning when the bolsters oscillate in the opposite direction, substantially as specified.

6. In a center bearing, the combination with upper and lower center plates, one furnished with a hub and the other with an opening to receive said hub, said plates having annular recesses to receive a connecting ring, a connecting ring therein, one of said plates having a lip adapted to be bent down over said connecting ring after the parts are assembled, substantially as specified.

7. The combination with two oscillatory plates, of an intermediate plate, two sets of anti-friction devices, one on each side of said intermediate plate, two spiders, each having removable chock devices for chocking or locking the anti-friction devices from turning in one direction, substantially as specified.

8. The combination with two oscillatory plates, of an intermediate plate, two sets of anti-friction devices, one on each side of said intermediate plate, two spiders, each having removable chock devices for chocking or locking the anti-friction devices from turning in one direction while permitting them to turn in the other direction, substantially as specified.

9. The combination with two center plates, of an intermediate plate, two sets of alternately arranged long and short radially extending cylindrical sectional rollers, one set on each side of said intermediate plate and means for alternately chocking rollers of each set from rotating according as the center plates oscillate in one direction or the other, said radially arranged sectional rollers being alternately long and short ones substantially as specified.

10. The combination with two center plates, of an intermediate plate, two sets of alternately arranged long and short radially extending cylindrical sectional rollers, one on each side of said intermediate plate, two spiders having rectangular pockets to receive said sectional rollers, each furnished with chocking devices for locking the rollers from turning in one direction, said radially arranged sectional rollers being alternately long and short ones substantially as specified.

11. The combination with two center plates, of an intermediate plate, two sets of cylindrical sectional rollers, one on each side of said intermediate plate, two spiders, each having chocking devices for locking the rollers from turning in one direction, said chocking devices being removable, substantially as specified.

12. The combination with upper and lower center plates, of a roller spacing spider having alternately arranged long and short rectangular pockets or openings to receive cylindrical sectional rollers and cylindrical sectional rollers each composed of a plurality of sections between said center plates and fitting in the pockets of the spider, said radially arranged sectional rollers being alternately long and short ones substantially as specified.

JOHN F. O'CONNOR.

Witnesses:
 WILLIAM A. GEIGER,
 H. M. MUNDAY.